United States Patent

Yaji et al.

[11] Patent Number: 5,787,825
[45] Date of Patent: Aug. 4, 1998

[54] SEEDING MACHINE WITH SENSOR CONTROLLED PLANTING AT PREDETERMINED DEPTH

[75] Inventors: Yukio Yaji; Nobuo Ito; Kota Motobayashi; Kentaro Nishiwaki; Shinichi Mujinazawa; Kazuhiro Kudo; Hisaya Tanaka, all of Iwate-ken, Japan

[73] Assignee: Director General of the Touhoku National Agiculture Experiment Station; Yoshihiro Yamashita, Morioka, Japan

[21] Appl. No.: 831,870

[22] Filed: Apr. 2, 1997

[30] Foreign Application Priority Data

Mar. 10, 1997 [JP] Japan ................. 9-055121

[51] Int. Cl.⁶ ........................................ A01C 7/00
[52] U.S. Cl. .................. 111/174; 111/170; 111/200; 111/278; 221/13; 221/211; 221/278; 222/61
[58] Field of Search ........................ 111/200, 100, 111/102, 104, 105, 118, 127, 128, 14, 170, 174; 172/2; 364/424.07; 47/1.01, 1.7, 58; 239/1, 8, 9, 10, 650, 654, 655, 754, 310, 569; 222/52, 61, 630, 263, 251, 282, 310, 373, 394; 221/278, 9, 13, 211; 701/50

[56] References Cited

U.S. PATENT DOCUMENTS

| | | | |
|---|---|---|---|
| 4,031,963 | 6/1977 | Poggemiller et al. | 111/200 X |
| 4,072,251 | 2/1978 | Huang | 111/200 X |
| 4,106,414 | 8/1978 | Vastag | 111/200 |
| 4,432,675 | 2/1984 | Machnee | 111/174 X |
| 4,899,672 | 2/1990 | Paul | 111/174 |
| 5,067,421 | 11/1991 | Andersson | 111/174 X |
| 5,189,965 | 3/1993 | Hobbs et al. | 111/174 X |
| 5,247,761 | 9/1993 | Miles et al. | 111/104 X |
| 5,255,618 | 10/1993 | Berry | 111/200 |

*Primary Examiner*—Terry Lee Melius
*Assistant Examiner*—Christopher J. Novosad
*Attorney, Agent, or Firm*—Nikaido, Marmelstein, Murray & Oram LLP

[57] ABSTRACT

A seeding machine comprises: an air compressor for generating a positive air pressure; a soil hardness sensor for measuring soil hardness so as to produce a control signal to adjust the positive air pressure generated by the compressor; an air pressure adjuster for adjusting the positive air pressure generated by the air compressor in accordance with the control signal produced by the soil hardness sensor; a negative air pressure generator for generating a negative air pressure by making use of air under the positive air pressure; a change-over valve for effecting a change-over operation between the positive air pressure and the negative air pressure, so as to selectively supply the positive air pressure or the negative air pressure; a seed adsorber for catching a seed by virtue of the negative air pressure; a first air cylinder adapted to extend or contract by the positive air pressure, to cause a certain reciprocating movement of the seed adsorber; a second air cylinder adapted to extend or contract by the positive air pressure, to cause a reciprocating movement of the seed adsorber between a seed catching position and a seed ejecting position.

5 Claims, 2 Drawing Sheets

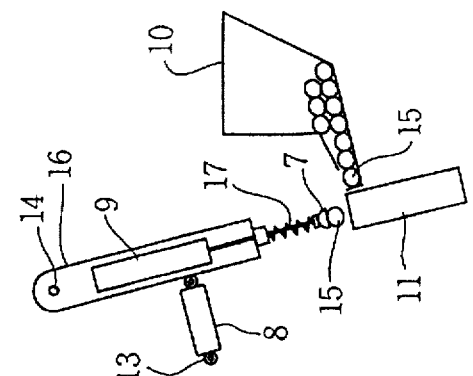
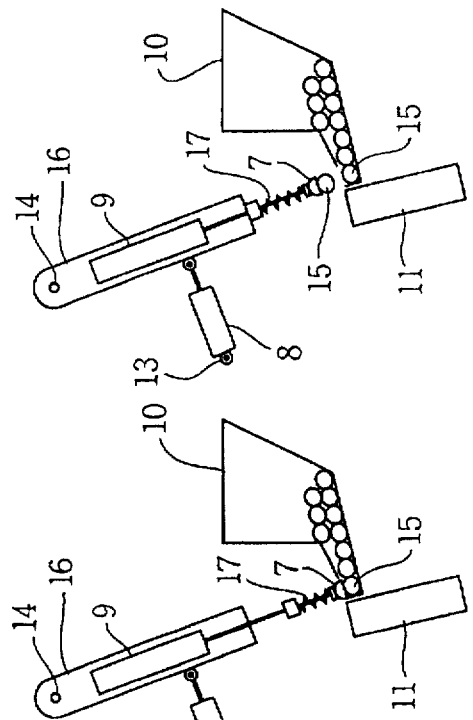
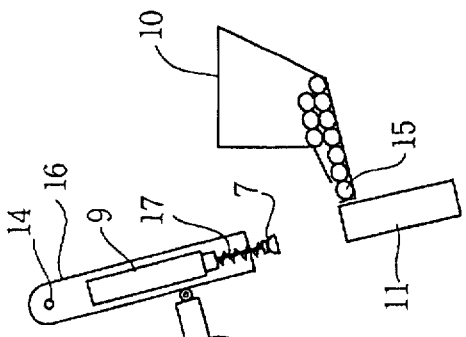
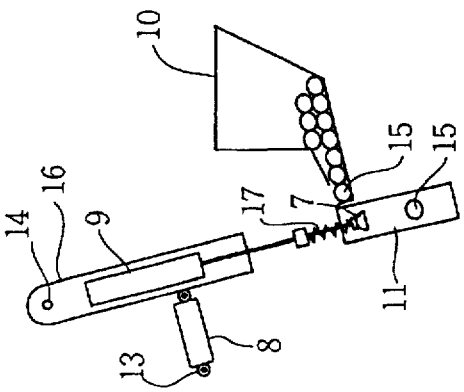
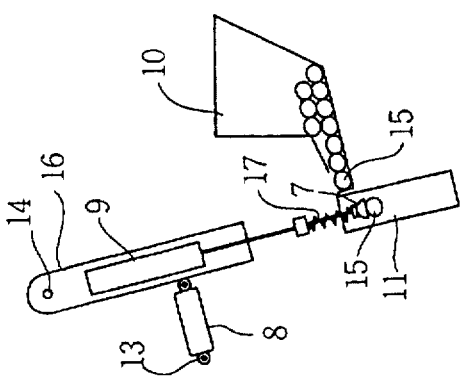

SEEDING MACHINE WITH SENSOR CONTROLLED PLANTING AT PREDETERMINED DEPTH

BACKGROUND OF THE INVENTION

The present invention relates to a seeding machine, in particular to a seeding machine capable of positioning seeds into soil at a predetermined constant depth and at equal space intervals.

In prior art, during a seeding operation for direct seeding on paddy field, an initial speed of a seed was usually obtained by virtue of free fall from a certain height of a seeding machine, or by means of an accelerated election using either a high speed air flow or a rotating disc. Such an initial speed is thus utilized to inject a seed into soil.

However, soil hardness will vary from place to place due to uneven surface of a paddy field or due to different water flowing conditions. For this reason, although seeds will receive the same accelerated speed, the seeding depth will be deep where soil is soft, but will be shallow where soil is hard. As a result, it is difficult to have seeds positioned at a desired predetermined constant depth in the soil.

In seeding operation for growing paddy land rice, it is usually required that the seeding depth should be 10 mm into soil. If the seeding depth is over 10 mm, there will be a retardation in germination and seedling growth. Further, if the seeding depth is more than 20 mm, there will be even such a possibility that a desired germination will not occur at all. On the other hand, if the seeding depth is too shallow, for instance, if a seed stays only on the surface of soil, the seed may be washed away by water flow, and the root of a seedling will cause a tendency of moving up the seed, undesirably resulting in a seedling with its root portion exposed to the soil surface. Such kind of a seedling, however, will fall down easily over the soil surface.

SUMMARY OF THE INVENTION

It is an object of the present invention to provide an improved seeding machine capable of positioning seeds into soil at a predetermined constant depth by providing each seed with an initial speed corresponding to soil hardness, so as to solve the above-mentioned problems peculiar to the above-mentioned prior art.

According to the present invention, there is provided a seeding machine for positioning seeds into soil at a predetermined constant depth and at equal space intervals, the seeding machine comprising: an air compressor for generating a positive air pressure; a soil hardness sensor for measuring soil hardness so as to produce a control signal to adjust the positive air pressure generated by the compressor; an air pressure adjusting means for adjusting the positive air pressure generated by the air compressor in accordance with the control signal produced by the soil hardness sensor; a negative air pressure generator for generating a negative air pressure by making use of the air under the positive air pressure; a change-over valve for effecting a change-over operation between the positive air pressure and the negative air pressure, so as to selectively supply the positive air pressure or the negative air pressure; a seed adsorber for catching a seed by virtue of the negative air pressure; a first air cylinder adapted to extend or contract by the positive air pressure, to cause a certain reciprocating movement of the seed adsorber; a second air cylinder adapted to extend or contract by the positive air pressure, to cause a reciprocating movement of the seed adsorber between a seed catching position and a seed ejecting position.

Here, the seed adsorber is provided to catch a seed each time by virtue of the first air cylinder and the negative air pressure, the seed adsorber carrying a seed is moved by virtue of the second air cylinder from a seed catching position to a seed ejecting position, the change-over valve is operated to supply a positive air pressure adjusted in accordance with the control signal corresponding to soil hardness, thereby rendering the seed to be ejected in an accelerated speed so as to be positioned into the soil at a predetermined constant depth.

According to one aspect of the present invention, the negative air pressure generator is adapted to produce a negative air pressure by virtue of a drawing force caused by air flowing under the positive air pressure.

According to another aspect of the present invention, an accelerated speed corresponding to soil hardness is given to a seed, so that each seed may be positioned into soil at a depth of about 10 mm.

According to a further aspect of the present invention, the seeds to be sowed are contained in a hopper and are caught by the seed adsorber from the hopper.

According to a still further aspect of the present invention, each seed caught by the seed adsorber is moved into a guide pipe, and ejected therefrom along an inner surface of the guide pipe.

The above objects and features of the present invention will become more understood from the following description with reference to the accompanying drawings.

BRIEF DESCRIPTION OF DRAWINGS

FIGS. 2a–2g are schematic explanatory views indicating operations of the seeding machine according to the present invention.

DETAILED DESCRIPTION OF THE PREFERRED EMBODIMENTS

Figure 1:
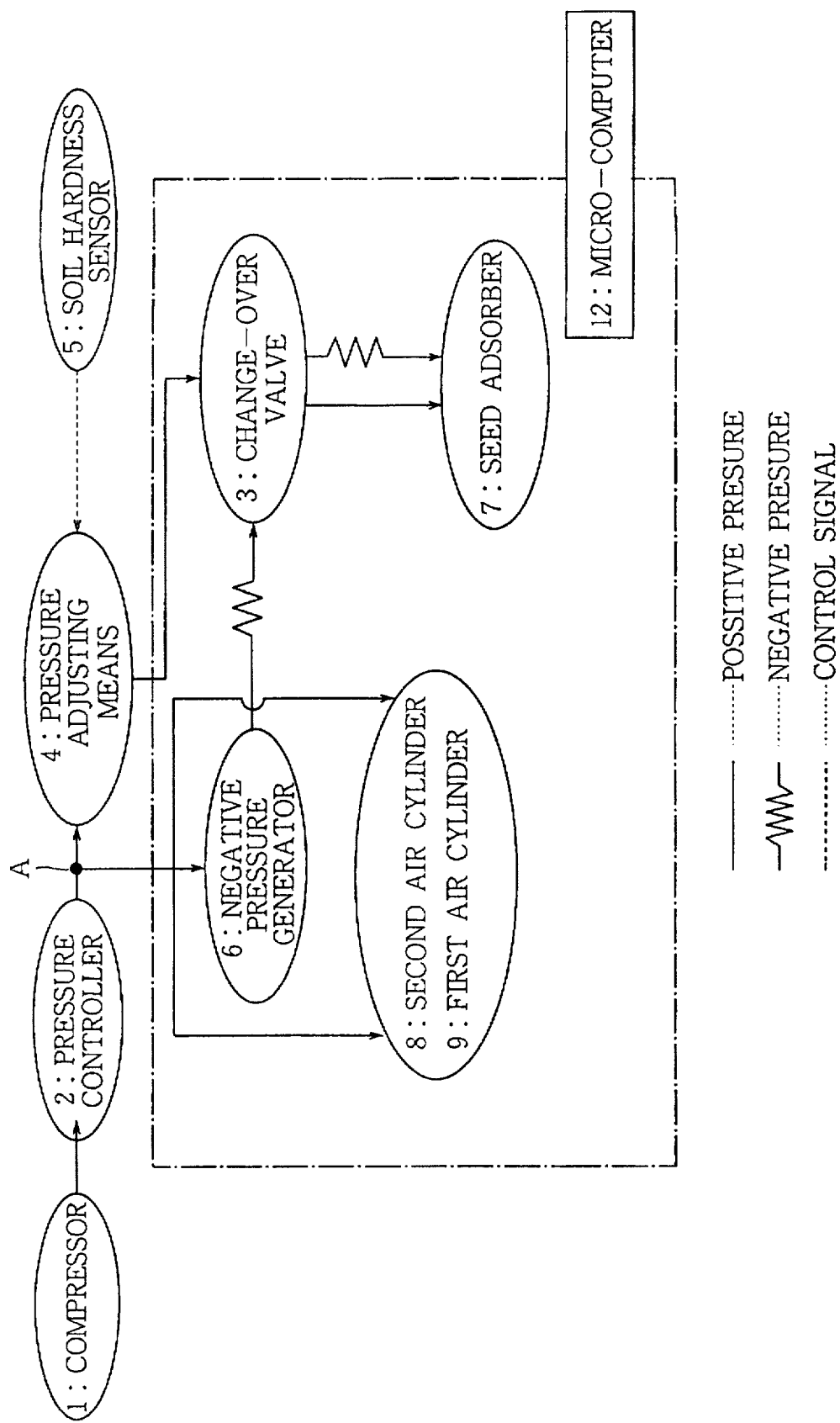
FIG. 1 is a schematic block diagram indicating a flow chart of positive air pressure, negative air pressure and control signal for use in the seeding machine according to the present invention.

Referring to FIG. 1, the seeding machine according to the present invention comprises: an air compressor 1 for generating a positive air pressure; an air pressure controller 2 connected with the air compressor 1 for controlling the positive air pressure from the air compressor 1; a soil hardness sensor 5 for measuring soil hardness so as to produce an air pressure control signal; a pressure adjusting means 4 for adjusting the positive air pressure in accordance with the air pressure control signal produced by the soil hardness sensor 5; a negative air pressure generator 6 provided to generate a negative air pressure by making use of a positive air pressure air; a change-over valve 3 for effecting a change-over operation between the positive air pressure and the negative air pressure; a seed adsorber 7 for catching a seed each time; a first air cylinder 9 adapted to extend and contract by the positive air pressure; a second air cylinder 8 adapted to extend and contract by the same positive air pressure.

In seeding operation using the apparatus of the present invention, the positive air pressure generated in the compressor 1 is stabilized by the air pressure controller 2 to a stabilized level. Then, a stabilized positive air pressure is caused to branch at a position A into two air pressure lines. One air pressure line is led to the negative air pressure generator 6, the other air pressure line is led to the air pressure adjusting means 4.

In the negative air pressure generator 6, a negative air pressure is generated by virtue of a drawing force caused by an air flow under the positive air pressure. In the air pressure adjusting means 4, the positive air pressure being supplied from the air pressure controller 2 is properly adjusted in accordance with the air pressure control signal produced by the soil hardness sensor 5, so that it is possible to provide a seed with an optimum initial speed suitable for the seed to be introduced into soil at a desired seeding depth.

Referring again to FIG. 1, the negative air pressure from the negative air pressure generator 6 and the positive air pressure from the air pressure adjusting means 4 are all led to the change-over valve 3, so that a change-over operation may be effected between the positive air pressure and the negative air pressure, thereby selectively supplying the positive air pressure or the negative air pressure to the seed adsorber 7. In this way, the seed adsorber 7 is able to adsorb a seed by virtue of the negative air pressure from the change-over valve 3, and is also able to provide the seed with an optimum initial speed suitable for the seed to be ejected into soil at a desired seeding depth.

As shown in FIG. 1, the positive air pressure branching from the position A is also supplied to the first and second air cylinders 9 and 8. With the use of the positive air pressure, the first and second cylinders 9 and 8 may be driven in a predetermined manner.

Referring again to FIG. 1, the seeding machine of the present invention is further provided with a micro-computer 12. With the use of the micro-computer 12, the negative air pressure for adsorbing a seed, the positive air pressure for ejecting the seed, and positive air pressure for driving the first and second cylinders 9 and 8 may all be subjected to sequence control, through the operations of respective valves thereof.

FIGS. 2a–2g are schematic explanatory views which indicate not only the operation but also the construction of the seeding machine according to the present invention.

As indicated in detail in FIGS. 2a–2g, the seeding machine of the present invention has a hopper 10 for receiving a predetermined amount of seeds which are to be sowed into soil, the seed adsorber 7 for catching a seed from the hopper 10, the first air cylinder 9 carrying the seed adsorber 7 and adapted to reciprocatingly move the seed adsorber 7 along the longitudinal direction of the cylinder 9, a cylinder holder 16 holding the cylinder 9, a second air cylinder 8 having one end thereof connected with the cylinder holder 16 so that the cylinder holder 16 may be swung about an fulcrum 14 formed at one end thereof, causing the seed adsorber 7 to be reciprocatingly moved between a seed catching position and a seed ejecting position. The seeding machine further has a guide pipe 11 provided for enabling a seed to be ejected in a predetermined direction.

FIG. 2a illustrates a condition where the seeding machine of the present invention is in its operational start position. At this moment, with the extending/contracting of the second air cylinder 8, the cylinder holder 16 is swung about the fulcrum 14 so that the seed adsorber 7 is moved to a position above an opening of the hopper 10. Meanwhile, the second cylinder 9 is in a contracted condition.

FIG. 2b illustrates a condition where the seed adsorber 7 is catching (adsorbing) a seed 15. At this moment, the air cylinder 9 extends for the seed adsorber 7 to reach a seed 15, and the seed 15 is thus caught (adsorbed) by the adsorber 7 upwardly by virtue of the negative air pressure which is supplied from the change-over valve 3. Meanwhile, with the effect of a coiled spring 17 mounted on the seed adsorber 7, the seed adsorber 7 is sure to move downwardly under a predetermined pressure to catch the seed 15 so as to prevent any possible failure in adsorbing process.

FIG. 2c illustrates a condition where the seed adsorber 7 carrying a seed 15 is moving upwardly from the hopper 10. At this moment, the air cylinder 9 is caused to contract so as to pick-up a seed out of the hopper 10.

FIG. 2d illustrates a condition where the seed adsorber 7 carrying a seed 15 is moving from the hopper 10 to the guide pipe 11. At this moment, the air cylinder 8 contracts so that the cylinder holder 16 is caused to pivot (swing) leftwardly in the drawing, with the fulcrum 14 serving as a pivoting (swinging) center, enabling the seed adsorber 7 carrying the seed 15 to arrive at a position above an upper opening of the guide pipe 11.

FIG. 2e illustrates a condition where the seed adsorber 7 carrying a seed 15 has entered the interior of the guide pipe 11. At this moment, the air cylinder 9 is caused to extend so as to move the seed adsorber 7 together with the seed 15 into the guide pipe 11.

FIG. 2f illustrates a condition where the seed adsorber 7, by virtue of the positive air pressure, is operated to eject the seed 15 in an accelerated speed in a direction along the inner surface of guide pipe 11. At this moment, the positive air pressure for ejecting the seed from the adsorber 7 is the air pressure adjusted in the air pressure adjusting means 4 in accordance with a control signal corresponding to soil hardness. Namely, in the seeding machine of the present invention, it is possible to provide the seed 15 with an initial speed corresponding to soil hardness, such that the seed 15 may be positioned in the soil at a depth of 10 mm. During this step, the air cylinder 9 is still in its extended condition.

FIG. 2g illustrates a condition where the air cylinder 9 is in its contracted position after the seed 15 has been ejected from the seed adsorber 7 through the guide pipe 11.

In this way, during the seeding operation using the seeding machine of the present invention, since it is possible to provide a seed with an initial speed corresponding to soil hardness, each seed may be properly ejected so as to be positioned into the soil at a predetermined constant depth irrespective of the hardness of the soil.

Therefore, in seeding operation on paddy land, since all the seeds may be properly ejected to position into the soil at a predetermined constant depth, it is possible not only to prevent a retardation in germination and seedling growth, but also to prevent a phenomenon that a seedling occurs with its root portion exposed to the soil surface, thereby ensuring an improved seeding operation with a higher precision as compared the prior art.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A seeding machine for positioning seeds into soil at a predetermined constant depth and at equal space intervals, said seeding machine comprising:

an air compressor for generating a positive air pressure;

a soil hardness sensor for measuring soil hardness so as to produce a control signal to adjust the positive air pressure generated by the compressor;

an air pressure adjusting means for adjusting the positive air pressure generated by the air compressor in accordance with the control signal produced by the soil hardness sensor;

a negative air pressure generator for generating a negative air pressure by making use of air under the positive air pressure;

a change-over valve for effecting a change-over operation between the positive air pressure and the negative air pressure, so as to selectively supply the positive air pressure or the negative air pressure;

a seed adsorber for catching a seed by virtue of the negative air pressure;

a first air cylinder adapted to extend or contract by the positive air pressure, to cause a certain reciprocating movement of the seed adsorber;

a second air cylinder adapted to extend or contract by the positive air pressure, to cause a reciprocating movement of the seed adsorber between a seed catching position and a seed ejecting position;

wherein the seed adsorber is provided to catch a seed each time by virtue of the first air cylinder and the negative air pressure, the seed adsorber carrying a seed is moved by virtue of the second air cylinder from a seed catching position to a seed ejecting position, the change-over valve is operated to supply the positive air pressure adjusted in accordance with the control signal corresponding to soil hardness, thereby rendering the seed to be ejected in an accelerated speed so as to be positioned into the soil at a predetermined constant depth.

2. The seeding machine according to claim 1, wherein the negative air pressure generator is adapted to produce a negative air pressure by virtue of a drawing force caused by air flowing under the positive air pressure.

3. The seeding machine according to claim 1, wherein an initial speed corresponding to soil hardness is given to a seed, so that each seed may be positioned into soil at a depth of about 10 mm.

4. The seeding machine according to claim 1, wherein the seeds to be sowed are contained in a hopper and are caught by the seed adsorber from the hopper.

5. The seeding machine according to claim 1, wherein each seed caught by the seed adsorber is moved into a guide pipe, and ejected therefrom along an inner surface of the guide pipe.

* * * * *

UNITED STATES PATENT AND TRADEMARK OFFICE
CERTIFICATE OF CORRECTION

PATENT NO. : 5,787,825

DATED : August 4, 1998

INVENTOR(S) : Yaji et al.

It is certified that error appears in the above-identified patent and that said Letters Patent is hereby corrected as shown below:

```
 On the title page;
Item [73], line 2, delete "Agiculture" insert therefor

-- Agriculture --
```

Signed and Sealed this

Seventeenth Day of November, 1998

Attest:

BRUCE LEHMAN

Attesting Officer      Commissioner of Patents and Trademarks